March 23, 1943.  M. M. CUNNINGHAM ET AL  2,314,608
CUSHION STRUCTURE
Filed Nov. 14, 1940
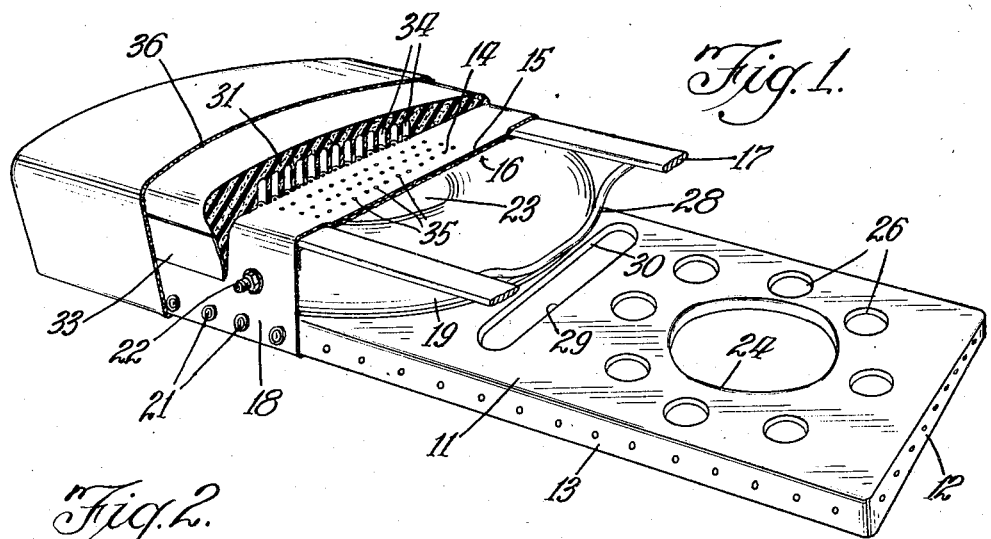
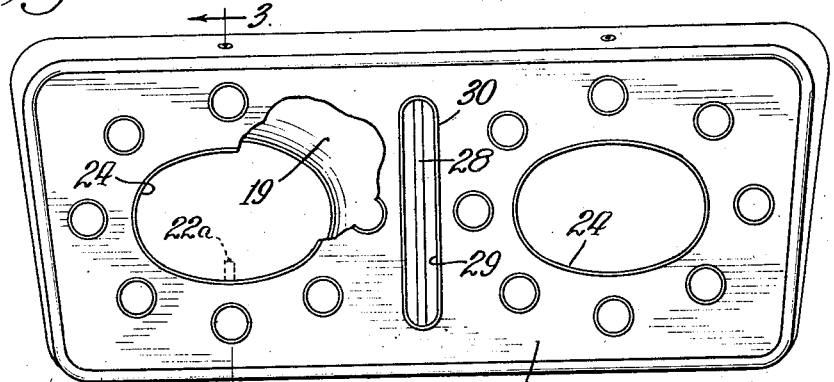
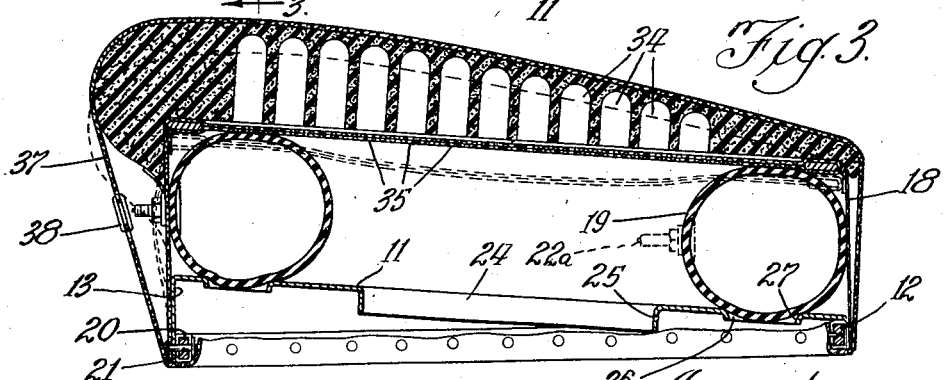
Inventors:
Marion Morgan Cunningham and
Ernest Theodore Wise
By Eugene M. Giles Atty.

Patented Mar. 23, 1943

2,314,608

UNITED STATES PATENT OFFICE 2,314,608

CUSHION STRUCTURE

Marion Morgan Cunningham, South Bend, Ind., and Ernest Theodore Wise, Plymouth, Mich., assignors to Mishawaka Rubber and Woolen Manufacturing Company, Mishawaka, Ind., a corporation of Indiana Application November 14, 1940, Serial No. 365,624

7 Claims. (Cl. 155—179)

Our invention relates to cushion structures and has reference more particularly to structures composed of superposed differentially compressible sections.

The principal objects of our invention are to provide an improved cushion structure for seats, mattresses and other articles of similar nature; to minimize weight as well as cost without sacrificing desirable cushioning characteristics; to permit regulation of cushion compressibility to suit the user; to permit convenient and satisfactory employment of pneumatic cushioning elements with ease of access thereto for replacement or repair; and to utilize a standard form of pneumatic element already available on the market, these and other objects being accomplished as pointed out in the following description wherein reference is made to the accompanying drawing, in which, Fig. 1 is a perspective view of a seat cushion structure embodying the present invention, portions being broken away to show details of the construction;

Fig. 2 is a somewhat reduced bottom view of the cushion structure of Fig. 1 with a portion thereof broken away; and Fig. 3 is an enlarged sectional view on the line 3—3 of Fig. 2, the parts being shown in normal position in full lines, and in partly depressed position in dotted lines.

Referring to the drawing, which shows as an illustrative form of our invention a seat cushion structure suitable for use in automobile the reference numeral 11 indicates the cushion base which may be made of sheet metal as shown with a marginal depending flange 12 widened at the front as indicated at 13 to support the deck 11 in a rearwardly inclined position as shown in Fig. 3. A fabric deck 14, preferably constructed as disclosed in application Serial No. 347,627 of Marion Morgan Cunningham of fabric laminations 15 and 16 adhesively secured together and stretched under tension on a marginal frame 17, has one of the fabric laminations, for example the top fabric 15, extended beyond the frame 17 to provide depending portions or skirts 18 around the deck which are secured along their lower margins to the base 11 to form with the base 11 an enclosure for one or more pneumatic elements 19 by which the deck 14 is resiliently held at an elevation, governed by the width of the fabric portions 18, above the base 11. Preferably a tacking strip 20 is secured around the lower margin of the depending flange 12 of the base 12 at the inner side thereof in any convenient manner, as for example, by rivets 21 and these rivets may be closely spaced and employed to secure the lower margins of the fabric portions 18 to the base as shown.

Two pneumatic elements 19 are employed in the present structure, on account of the length of the seat, each of which is a hollow ring shaped rubber tube like the inner tube of an automobile tire and provided with a valve stem 22 through which the tube is inflatable and when inflated the tops of these elements 19 bear against the bottom of the deck 14 and hold the latter at an elevation above the base 11.

Each tube 19 when inserted in place between the deck 14 and base 11 assumes a slightly elliptical form due to confinement between the front and rear fabric portions 18 and has a central opening 23 which assumes a similar elliptical form with the major axis thereof extending lengthwise of the seat, and below each opening 23 the base 11 is provided with a corresponding elliptical opening 24 leaving ample base surface therearound to support the tube 19, the margins of the opening 24 being turned down as indicated at 25 to reinforce the base. Preferably also the base 11 is provided at intervals under each tube 19 with openings 26, likewise with downturned margins 27, to allow free expansion of the rubber walls of the tubes downwardly at these places and thereby increase the overall free surface of the pneumatic unit. The downward displacement of the tube walls through these openings also assists in retaining the tubes in proper position within the unit. The size of these openings 26 may be large or small as desired to increase or decrease the overall free surface of the tubes.

Thus each opening 24 permits convenient access to the space between the deck 14 and base 11 to insert or remove the respective tube 19 so that the latter may be easily installed in the cushion structure and removed for repairs or replacement and if the valve stem 22 is placed at the inside of the ring as indicated by dotted lines at 22ª, in Fig. 3 to project into the opening 23 thereof as in the usual automobile tire tube, the valve stem is then accessible through the opening 24 for inflating.

Because of the length of the seat, it is preferred to centrally brace the front and rear lengths of the frame 17, a brace 28 being provided for the purpose which is secured at its opposite ends to said front and rear lengths respectively of the frame 17 and curved downwardly therebetween to afford ample clearance for downward flexing of the fabric deck 14. This brace 28 is interposed between the pneumatic elements 19 and under this brace the base 11 is provided with an elongated slot 29 to accommodate the downwardly curved portion of the brace 28 when the deck 14 is fully depressed, the margins of this slot 29 being turned downwardly as at 30 for reinforcing purposes.

A pad 31 of spongy rubber is applied on the deck 14, preferably being secured thereto by adhesive throughout the area of the deck, and extends over the marginal frame 17 of said deck, this pad being preferably shaped at the front with an overhanging portion which extends downwardly in front of the front fabric 18 substantially as shown at 32 in Figs. 1 and 3. A fabric tape 33 which is cemented to the front face of the portion 32 extends downwardly therebelow and is cemented to the fabric 18.

This spongy rubber pad 31 is preferably of interconnected cellular type, such as is commonly made of latex foam, affording permeability to air which upon compression of the pad is expelled therefrom sufficiently slowly to slightly retard compression and upon release of compression the air re-permeates the pad likewise sufficiently slowly to avoid rebound. Thus the spongy rubber pad 31 contributes ease of cushioning action which is highly desirable and counteracts the relatively faster compressive and restorative action of the pneumatic elements 19. This pad is preferably molded with cavities 34 extending upwardly therein from the bottom and the deck is also preferably provided with relatively small openings 35 therethrough permitting restricted air flow to and from the cavities 34 which thus contribute to the easy action of the spongy rubber pad.

A covering 36 of upholstery material is applied over the spongy rubber pad 31 and drawn down around the cushion structure in the usual manner and secured to the tacking strip 20. Because of the overhanging front of the pad 31 the front portion 37 of the upholstery fabric 36 is spaced from the front portion 18 of the deck fabric through which the valves 22 extend, and the valves 22 are of such length that they are normally located between the front upholstery fabric 37. This fabric 37 however is provided with a grommeted opening in front of each valve stem as indicated at 38 through which the valve stem therebetween is accessible for inflating the respective tube 19.

While we have described our invention in a preferred form, we are aware that various changes and modifications may be made without departing from the principles of our invention, the scope of which is to be determined by the appended claims.

We claim as our invention:

1. A cushion structure of the class described, comprising a supporting base, differentially compressible cushiony sections mounted thereon, in superposed relation, a flexible fabric like deck interposed between and separating said sections, said deck being stretched on a marginal frame and being freely depressible with said sections, flexible members connecting said deck and said base to form therewith an enclosure in which the lower of the cushiony sections is removably confined, and said base having an opening therethrough through which the latter section is insertable into and removable from said enclosure.

2. A cushion structure of the class described comprising, a supporting base, a flexible cushion supporting deck spaced from said base and comprising a fabric stretched on a marginal frame, flexible members depending marginally from said deck and attached to said base to provide a cushion enclosure, a hollow inflatable ring shaped cushion in said enclosure resiliently holding the base and deck in separated relation, said cushion having a central opening therethrough and said base having a corresponding opening through which said cushion is insertable into and removable from the enclosure, and a cushion pad overlying and secured to said deck.

3. A pneumatic cushion comprising a rigid base, a flexible cushion supporting deck spaced from and flexibly anchored to said base, a pneumatic member supported on said base and supporting said deck in spaced relation with respect to said base, and a spongy rubber cushion adhesively secured to said deck, said deck being stretched on a marginal frame and being freely depressible with the cushion and pneumatic member.

4. A cushion seat structure comprising, a base, an opening therein, a hollow inflatable cushion ring removably supported on said base at the area surrounding said opening, a flexible diaphragm overlying said ring and comprising a fabric stretched on a marginal frame, flexible skirts depending marginally from said diaphragm and attached to said base at their lower ends, and a seat cushion secured over said diaphragm.

5. A cushion seat structure comprising, a base, an opening therein, a hollow inflatable cushion ring removably supported on said base at the area surrounding said opening, said area being provided with means to retain said ring against accidental displacement, a flexible diaphragm overlying said ring and comprising a fabric stretched on a marginal frame, flexible skirts depending marginally from said diaphragm and attached to said base at their lower ends, and a seat cushion secured over said diaphragm.

6. A cushion seat structure comprising, a base, a hollow inflatable cushion supported on said base, a flexible diaphragm overlying said inflatable cushion and comprising a fabric stretched on a marginal frame, flexible skirts depending marginally from said diaphragm and attached to said base at their lower ends, and a seat cushion secured over said diaphragm.

7. A pneumatic cushion comprising a rigid base, a flexible cushion supporting deck spaced from and flexibly anchored to said base, a pneumatic member supported on said base and supporting said deck in spaced relation with respect to said base, and a cushion secured to said deck, said deck being stretched on a marginal frame and being freely depressible with the cushion and pneumatic member.

MARION MORGAN CUNNINGHAM.
ERNEST THEODORE WISE.